United States Patent Office 3,825,474
Patented July 23, 1974

3,825,474
PROTEUS RESISTANT AGAR CULTURE MEDIA
Patricia P. Cooper, Claymont, Del.
(1905 Fairfield Drive, Wilmington, Del. 19810)
No Drawing. Filed June 22, 1972, Ser. No. 265,324
Int. Cl. C12k 1/04
U.S. Cl. 195—103.5 R     3 Claims

ABSTRACT OF THE DISCLOSURE

The addition of penicillin G during the preparation of agar media results in Proteus resistant agar media which can be used in the isolation of gram-negative micro-organisms.

BACKGROUND OF THE INVENTION

(a) Field of the Invention

This invention relates to the preparation of culture media for the isolation of micro-organisms. More specifically this invention relates to a Proteus resistant agar media and to processes for their preparation.

(b) Description of the Prior Art

Agar containing added nutrients is a common support media employed in the culturing of micro-organisms for the purpose of isolating and identifying individual bacteria. A method of isolating individual bacteria involves culturing micro-organisms on agar plates. This process involves streaking the surface of an agar plate (a Petri-dish containing agar fortified with nutrients) with a sample containing different micro-organisms. The individual organisms are deposited along the track of the streak. Thereafter the agar plate is incubated at selected temperatures for a period of time. The individual organisms grow in colonies along the track of the streak and may be further isolated by subculturing, i.e., taking a sample from a particular colony which is partially contaminated and repeating the process with another agar plate. Identification of the isolated micro-organisms is accomplished after isolation by conventional techniques, e.g. microscope examination.

Culturing of micro-organisms may be unsuccessful in instances where an organism with high motility is present in the rest of the specimen. Motile organisms are able to migrate over the surface of the agar plate. This process, called "swarming" results in contamination of the entire surface of the agar plate. When this happens, it is difficult to isolate pure micro-organisms.

Isolation and identification of micro-organisms is important in the treatment of hospital patients because selective treatment of a patient's illness requires that the particular organisms causing the illness be known. Where more than one micro-organism is present in a specimen taken from a patient, it is important that each be isolated and identified. If one organism is motile, subculturing will be necessary in order to isolate pure cultures of the other micro-organisms present.

The additional culturing will delay identification from one to three days. This delay in identification results in a delay in prescribing the proper medication and a delay in the patient's recovery.

The genus Proteus is a gram-negative rod which is frequently present along with other micro-organisms in specimens taken from patients. It is highly motile and frequently causes problems in isolation and identification of other micro-organisms. Substances which are known to stop the growth of gram-negative organisms will stop the growth of Proteus. Some of these substances do not stop the growth of gram-positive organisms. Phenylethyl alcohol (PEA) meets these requirements and is used in agar plates in a procedure for isolation of gram-positive organisms.

A corresponding procedure for isolating gram-negative organisms was previously unavailable.

SUMMARY OF THE INVENTION

It has now been found that gram-negative organisms may be isolated from their mixture with Proteus species by culturing the micro-organism on agar plates in which the agar contains nutrients plus about 10 units per milliliter of penicillin G. The Proteus resistant agar plates are prepared by adding the penicillin to the agar at temperatures above 45° C. up to the decomposition temperature of penicillin G.

DESCRIPTION OF THE PREFERRED EMBODIMENTS

Example 1.—Preparation of eosin methylene blue (EMB) agar

Weigh the following amounts of ingredients and place them in a one liter Erlenmeyer flask.

| | | |
|---|---|---|
| Geylsate (pancreatic digest of gelatin) | grams | 1.00 |
| Lactose | do | 0.5 |
| Sucrose | do | 0.5 |
| Dipotassium phosphate | do | 0.2 |
| Agar-agar (dried) | do | 1.35 |
| Eosin Y | do | 0.4 |
| Methylene blue | do | 0.0065 |
| Distilled water | ml | 100 |

Mix these ingredients throughly, heat to boiling, then cap the flask with an air porous stopper, such as filter paper, secured with rubber bands. Place in an autoclave at 121° C. and 15 pounds per square inch pressure for 15 minutes. Cool the agar solution to about 49° C.

Example 2.—Preparation of Proteus resistant plates and agar plates

Mix about 90 milliliters of the hot agar solution of Example 1 with 10 milliliters of a solution containing 100 units of sodium penicillin G per milliliter (1 unit is equal to 0.6 micro-grams) to yield 100 milliliters of agar solution containing 10 units of penicillin G per milliliter. Prepare agar plates by dispensing about 20 milliliters of this hot solution per sterile Petri-dish and allow them to cool. Incubate the agar plates 12–18 hours at 37° C. to determine that they are sterile and thereafter store at 4° C.

Example 3.—Table of results

The following table sets forth the results of culture specimens from hospital patients using the agar from Examples 1 and 2.

Units of Penicillin per Milliliter of Agar Medium to Control Proteus

| Patient number | 78.1 units | 7.8 units | 0 |
|---|---|---|---|
| 1 | No growth | No growth | Proteus. |
| 2 | do | Enterobacter | Do. |
| 3 | do | E. coli | E. coli Proteus. |

It is evident from the above table that 78.1 units of penicillin G is too much in that it prevents the growth of all gram-negative organisms. Use of 7.8 units of penicillin G stops the growth of Proteus but permits other gram-negative organisms such as E. coli and Enterobacter to grow. When no penicillin is present Proteus normally covers the agar surface although in the table E. coli in one case was present. In practice it is found that a range of about 7 to 15 units of penicillin per milliliter of media is the preferred range of penicillin concentration. Lesser amounts are not as reliable in inhibiting Proteus while larger amounts do not offer any advantage over the preferred range.

Preparation of agar media containing nutrients other than those listed in Example 1 is accomplished in a similar way. Thus *Proteus* is inhibited in: bismuth sulfite agar, brilliant green agar, cetrimide agar, Christensen citrato agar, citrato agar, fermentation basal medium, fluid thiglycolate medium U.S.P. and MacConkey agar.

By means of this invention the following gram-negative organisms are isolated free of *Proteus*:

| | |
|---|---|
| *Citrobacter* | *Shigela* |
| *Arizona* | *Samonella* |
| *Pseudomonas* | *Edwardsiella* |
| *Serratia* | *Klebsiella* |

The preferred penicillin to be added to the agar media is penicillin G also known as benzyl-penicillin. The penicillin is preferably added to the agar media in the form of a metal salt e.g. sodium, potassium or barium salts.

Generally, and preferably, the agar content of the media is about 1.35 percent. However, formulations up to 6 percent agar may be employed in the practice of this invention.

I claim:

1. In a method for isolating gram-negative organisms on a agar medium so that individual micro-organisms may be identified, where the specimen to be determined contains micro-organisms of the genus *Proteus*, the improvement which comprises preparing the agar culture medium, with between 7 and 9 units of penicillin G per milliliter of medium whereby the genus *Proteus* is stopped from growing on the culture medium so that other gram-negative micro-organisms may grow and be isolated.

2. A method according to Claim 1 wherein the agar medium is eosin methylene blue agar.

3. A method according to Claim 1 wherein the agar medium contains about 7.8 units of penicillin G per milliliter of medium.

References Cited

Grove et al.: "Assay Methods of Antibiotics," p. 195 (1955).

Goldberg: "Antibiotics, Their Chemistry and Non-Medical Uses," pp. 545–6 (1959).

Thomas et al.: "J. Bact.," 49:623–627 (1945).

A. LOUIS MONACELL, Primary Examiner

R. J. WARDEN, Assistant Examiner

U.S. Cl. X.R.

195—100